(12) United States Patent
Gosangari et al.

(10) Patent No.: US 12,435,013 B2
(45) Date of Patent: Oct. 7, 2025

(54) ETHANOL TO ETHYLENE PROCESS

(71) Applicant: UOP LLC, Des Plaines, IL (US)

(72) Inventors: Saikrishna Laxmirajam Gosangari, Gurugram (IN); Manuela Serban, Northbrook, IL (US); Martha Leigh Abrams, Des Plaines, IL (US); Ashish Mathur, Gurgaon (IN); Balkrishna Tope, Gurgaon (IN); Eseoghene Jeroro, Chicago, IL (US); Jeannie Mee Blommel, Oregon, WI (US)

(73) Assignee: UOP LLC, Rosemont, IL (US)

( * ) Notice: Subject to any disclaimer, the term of this patent is extended or adjusted under 35 U.S.C. 154(b) by 44 days.

(21) Appl. No.: 18/457,246

(22) Filed: Aug. 28, 2023

(65) Prior Publication Data
US 2024/0067584 A1    Feb. 29, 2024

(30) Foreign Application Priority Data

Aug. 30, 2022 (IN) .............................. 202211049520
Aug. 30, 2022 (IN) .............................. 202211049523
Aug. 30, 2022 (IN) .............................. 202211049527

(51) Int. Cl.
*C07C 1/24* (2006.01)

(52) U.S. Cl.
CPC ............ *C07C 1/24* (2013.01); *C07C 2521/04* (2013.01)

(58) Field of Classification Search
CPC .................. C07C 1/24; B01J 8/04; B01J 8/06
See application file for complete search history.

(56) References Cited

U.S. PATENT DOCUMENTS

| 2009/0082605 A1 | 3/2009 | Bailey et al. |
| 2015/0265992 A1* | 9/2015 | Taheri ............... B01J 8/025 |
| | | 422/652 |
| 2015/0299068 A1 | 10/2015 | Coupard et al. |

FOREIGN PATENT DOCUMENTS

| CN | 106608787 A | 5/2017 |
| CN | 113045372 B | 1/2022 |
| JP | 2016150932 A | 8/2016 |

OTHER PUBLICATIONS

Search Report and Written Opinion for PCT/US2023/073174 dated Dec. 13, 2023.

* cited by examiner

*Primary Examiner* — Sharon Pregler
(74) *Attorney, Agent, or Firm* — Paschall & Associates, LLC; Mark Goldberg

(57) ABSTRACT

A process for dehydration of ethanol to produce ethylene is provided. Ethanol is dehydrated to produce ethylene and the subsequent conversion of ethylene to longer chain olefins and then their hydrogenation to produce long chain paraffins. In some embodiments, a split feed is employed to improve efficiency and a caustic wash column is eliminated. The advantages of the process include a lower requirement for steam and a reduction in the combined reactor volume of 30-40% when two reactors are used as compared to a single reactor.

13 Claims, 1 Drawing Sheet

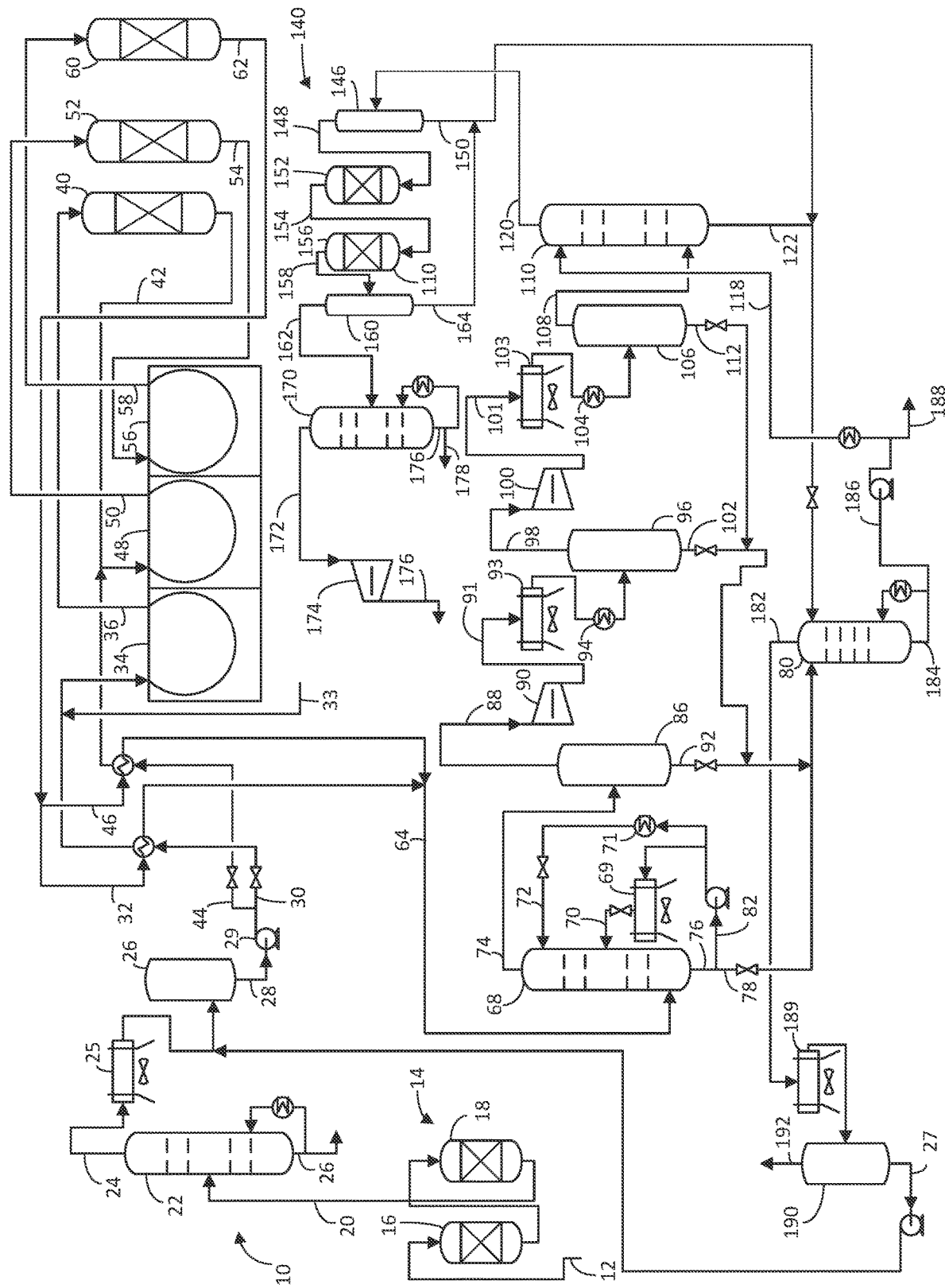

ETHANOL TO ETHYLENE PROCESS

CROSS-REFERENCE

This application claims priority from Indian provisional patent applications 202211049527, 202211049520 and 202211049523 filed Aug. 30, 2022.

FIELD

This relates to an ethanol dehydration process to produce ethylene. More particularly, this relates to a flow scheme for an ethanol dehydration process in some instances without a caustic scrubber. In other instances, the flow scheme has a split feed configuration to allow for the use of less steam and a reduction in the reactor section size.

BACKGROUND

Oil and gas refiners worldwide are exploring methodologies and routes to reduce the carbon footprint and are moving towards sustainable processes. A process for converting bioethanol to green ethylene is one of such sustainable processes.

This disclosure concerns the processing of ethylene.

Advantages have been found in the dehydration of ethanol to produce ethylene by operating a split flow and/or deleting the use of a caustic scrubber in the process. To produce ethylene for further processing as an olefinic feed stock for example, for ethylene oligomerization.

SUMMARY

A process is provided of converting an ethanol feed stream to ethylene comprising dividing said ethanol feed stream into a first portion and a second portion; sending said first portion to a reactor through a charge heater; mixing steam with said first portion at said charge heater and sending an ethanol/steam mixture to said reactor; subjecting said ethanol/steam mixture to sufficient conditions to dehydrate said ethanol to produce an effluent comprising ethylene and water; combining said effluent with said second portion to form an effluent/second portion mixture and sending said mixture to a second reactor to be reacted to produce a product effluent comprising ethylene and water wherein said reactor section is from 30-40% reduced in volume as compared to a process containing a caustic scrubber and wherein said first and second reactor contain less steam than a process having a single reactor.

In another embodiment is provided, A process of converting an ethanol feed stream to ethylene comprising dividing said ethanol feed stream into a first portion and a second portion to be sent to a reactor section comprising a first reactor and a second reactor wherein a combination of said first reactor and said second reactor comprises a reactor volume of about 60-70% a volume of a single reactor system; sending said first portion to said first reactor through a charge heater; mixing steam with said first portion at said charge heater and sending an ethanol/steam mixture to said first reactor; subjecting said ethanol/steam mixture to sufficient conditions to dehydrate said ethanol to produce an effluent comprising ethylene and water; combining said effluent with said second portion to form an effluent/second portion mixture and sending said effluent/second portion mixture to said second reactor to be reacted to produce a product effluent comprising ethylene and water.

BRIEF DESCRIPTION OF THE DRAWINGS

The FIGURE provides a view of the flowscheme.

DETAILED DESCRIPTION

The ethanol dehydration process unit is divided into six main sections, the feed pretreatment section, feed purification section, reactor section, ethylene compression section and water wash section.

In the feed ethanol pretreatment section, metals may be removed by using ion-exchange resin guard beds. It is configured in lead/lag flow scheme such that one vessel can be taken offline and reloaded while one vessel is online. The ion-exchange resin vendors recommend a regenerable system using HCl or sulfuric acid as a regenerant. An HCl regenerant is not appropriate as the unit has stainless steel metallurgy.

The demetallized product out of the ethanol pretreatment section is routed to the feed purification column (FPC) through the tube side of the fresh feed-overhead vapor exchanger. This column is designed to purge out the heavier molecules coming along with the ethanol feed through the column bottoms. The heavier molecules may consist of but are not limited to components such as C3+ alcohols, acetal, hexadecanoic acid, octadecanoic acid, isopentyl acetate, cyclohexanol, cyclopentanol, phenol, cresol, acetal etc. Some of these heavier molecules may convert to ketones within the reactors and tend to accumulate without exiting the process and hence need to be removed or minimized before a feed can be sent to the reactor section. The bottoms purge is expected to be <1.0% of the total feed consisting of concentrated heavies such as acetic acid, acetal, cresol, phenol, free fatty acids such as hexadecanoic acid and octadecanoic acid, some heavy alcohols etc.

Since there are no dissolved light ends expected with the ethanol feed stock, a total condensing system is suitable for this column. The receiver pressure controlled by nitrogen push-pull system is set to allow for using MP steam as reboiling medium for the column. The vapor from the column overhead is first condensed on the shell side of the fresh feed-overhead vapor exchanger followed by feed purification column overhead condenser before entering the feed purification column receiver. The receiver liquid at its bubble point is pumped by the feed purification column net overhead pumps and further subcooled in the feed purification column net overhead cooler. The subcooled material is mixed with the liquid ethanol recycle stream and cooled in the DEE absorber feed cooler before entering the DEE absorber on the top tray or the feed surge drum The DEE Absorber is floating with the dehydration separator vapor stream which enters below the bottom tray of the DEE absorber and this column is provided to remove diethyl ether from the dehydration separator vapor. The DEE absorber bottom sump is designed to provide 15 mins residence time to the liquid feed entering the reactor section.

The reactor section includes the following elements. The feed surge drum liquid or the DEE absorber bottoms liquid stream is pumped to the reactor section via the dehydration charge pump. The discharge stream is first preheated in the ethanol treated water exchanger. The preheated ethanol is split into two streams on flow control. The first split of feed stream is heated and vaporized in a first ethanol steam heater before entering the cold side (tube side) of the combined feed exchanger 1 (CFE1) followed by the charge heater. Before entering the CFE1, the vaporized feed is mixed with steam generated in steam generators. The combined stream is heated to required reaction temperature in the charge heater and routed to the first reactor.

The second split of feed stream is heated and vaporized before entering the cold side (tube side) of the second combined feed exchanger (CFE2). At the cold side outlet of CFE2, the feed stream is mixed with the first reactor effluent and routed to the first interheater where the stream is further heated to required reaction temperature. Steam does not take part in the reaction (except may be some minor side reactions) but the steam added in the reactor serves the dual purpose of controlling the endotherm across the reactor as well as maintaining the stability of the catalyst (reducing coke laydown). Minimizing temperature drop across the reactor is critical because at the lower reactor outlet temperature, the formation of diethyl ether is more pronounced. To ensure that the diethyl ether formation is limited, the second reactor effluent is passed through the second Interheater and again heated up to required reactor temperature before routing to the third reactor. The third reactor is a polishing reactor which ensures that the diethyl ether along with unconverted ethanol is converted to useful ethylene. The third reactor effluent is split and passes through the hot side (shell side) of the CFE1 and CFE2. The hot side outlet from the combined feed exchangers is further cooled and condensed in the waste water stripper reboiler followed by the dehydration product condenser before entering the dehydration separator.

The dehydration separator liquid stream is mainly water with some dissolved oxygenates and the stream is routed to the low-pressure waste water stripper while the vapor stream is essentially the ethylene product. As noted above, the dehydration separator vapor is routed to the DEE absorber.

The fired heaters used in the reactor section are designed as natural draft furnaces with the main process heating happening in the radiant section while the convection section of these fired heaters is designed to generate high pressure steam The ethylene compression section involves the following factors. The pressure requirement of the vapor product stream to the downstream oligomerization unit is in excess of 1000 psig and this is achieved by a four or five stage compressor system. Four stages may be specified with a reciprocating machine while five stages may be specified with a centrifugal machine. In one embodiment there would be four stage reciprocating machine with one operating and one standby. The number of stages may be based on the downstream unit pressure requirement as well as limiting the compressor discharge temperature to less than 90° C.

The vapor from the water wash tower mixes with the first stage ethylene compressor spillback before entering the first stage ethylene compressor suction drum to knockout any entrained liquid. The vapors from the drum are compressed in the first stage ethylene compressor and the compressor discharge is cooled in the first stage discharge cooler and the first stage discharge trim cooler, the cooled stream further mixes with the second stage ethylene compressor spillback and enters the first stage ethylene compressor discharge drum. The vapors from the first stage ethylene compressor discharge drum are split into two streams, the first stream is the first stage ethylene compressor spillback while the second stream is the net vapor stream entering the second stage ethylene compressor. The vapors are further compressed in the second stage ethylene compressor and the compressor discharge is cooled in the second stage discharge cooler and second stage discharge trim cooler; the cooled stream further mixes with the third stage ethylene compressor spillback and enters the second stage ethylene compressor discharge drum. The vapors from the second stage ethylene compressor discharge drum are split into two streams, the first stream is the second stage ethylene compressor spillback while the second stream is the net vapor stream entering the third stage ethylene compressor. The vapors are further compressed in the third stage ethylene compressor and the compressor discharge is cooled in the third stage discharge cooler and third stage discharge trim cooler before entering the third stage ethylene compressor discharge drum. The vapors from the third stage ethylene compressor discharge drum are split into two streams, the first stream is the third stage ethylene compressor spillback while the second stream is the net vapor product which enters the ethylene driers for removing saturated moisture. The dried vapors from the ethylene driers are mixed with the fourth stage ethylene compressor spillback and enter the fourth stage ethylene compressor suction drum. The vapors are compressed in the fourth stage ethylene compressor before entering the fourth stage ethylene compressor discharge drum. The fourth stage ethylene compressor discharge drum vapor is split into two streams, the first stream is the fourth stage ethylene compressor spillback while the second stream is the net vapor product which is routed to the oligomerization unit. The fourth stage ethylene compressor discharge is not cooled unlike upstream stages, and the hot vapor stream is directly routed to the oligomerization unit. To ensure that the fourth stage ethylene compressor discharge temperature does not exceed recommended limits, a fourth stage cooler is added on the compressor spillback line.

The saturated moisture in the vapor from the water wash tower are partially knocked out in the first stage ethylene compressor suction and discharge drum and the second and third stage ethylene compressor discharge drums. The knocked out liquid is mostly water, and this condensation is due to increase in pressure and drop in intermediate temperature. The knockout drum liquid is routed to waste water stripper.

Two ethylene driers loaded with molecular sieves are specified for moisture removal from the ethylene vapor product, and these are operated in lead-lag mode. Once the lead drier molecular sieves are saturated with moisture, the drier needs to be regenerated to restore the sieve capacity. The dried ethylene vapors coming out of the lag drier are used as regenerant medium. A slip stream from the lag drier outlet is routed to the regenerant superheater where the regenerant is heated up to required regeneration temperature before entering the drier under regeneration. The spent regenerant carrying the desorbed moisture out of the molecular sieves from the drier under regeneration is cooled and condensed in the regenerant condenser before entering the regenerant coalescer. The regenerant coalescer separates the water from the spent regenerant i.e. ethylene and this ethylene vapor is routed back to the first stage ethylene compressor suction drum on pressure control while the spent water is routed to the waste water stripper.

The waste water section consists of the waste water stripper and the water wash tower. The liquid from the dehydration separator, water wash tower bottoms, regenerant coalescer (intermittent) as well as knocked out liquid from the ethylene compressor section knockout drums is routed through the shell side of the waste water stripper feed-bottoms exchanger before entering the top tray of the waste water stripper. The waste water stripper is designed to strip off the oxygenates coming in with the feed as an overhead vapor product while recovering treated water in the bottoms.

The waste water stripper operates at 5-10 psig and the overhead vapors are cooled and condensed in the off-gas condenser before entering the off-gas knockout drum. The off-gas knockout drum liquid has majority of the alcohols carried over from the DEE absorber vapor unconverted alcohols from the reactor, water along with other non-selective oxygenates formed within the reactor such as acetaldehyde, ethers, acetic acid etc., which are recycled and mixed with the fresh feed and routed to the reactor section through the feed surge drum or the DEE absorber bottoms. The off-gas knockout drum vapor is a small purge stream which is a mix of olefins, dissolved in the dehydration separator and water wash tower liquid, as well as oxygenates. The waste water stripper has two reboiler systems. The waste water stripper auxiliary reboiler utilizes low pressure steam as reboiling medium, while the waste water stripper reboiler is process heat integrated with the hot dehydration reactor effluent upstream of the dehydration product condenser. The waste water stripper net bottoms is pumped by the treated water pumps through the tube side of the waste water stripper feed-bottoms exchanger and downstream is split into three streams. The first stream is the treated water used for vapor product oxygenate wash in the water wash tower. This stream is routed to the Water Wash Tower via the Ethanol-Treated water exchanger, treated water cooler and treated water trim cooler.

The second stream is the treated water quantity corresponding to the steam injected into the dehydration reactors plus 5% blowdown. This stream is routed to steam generators. The steam generated is sent to the dehydration reactor to meet the steam to ethanol ratio requirement. The continuous blowdown from steam generators is directly routed to the Waste Water Treatment facility. This stream is split at the upstream of the Ethanol-Treated Water Exchanger.

The third stream is the net treated water generated out of the various reactions occurring in the reactor section and is routed to the waste water treatment facility and this stream is taken from downstream of the treated water trim cooler.

As noted previously, the dehydration separator vapors can be routed to the DEE absorber or the water wash tower. The dehydration separator vapors have certain impurities/oxygenates such as acetaldehyde, diethyl ether, dimethyl ether, water, unconverted alcohols etc. which may need to be removed, depending on the further use of the ethylene product.

With a DEE absorber, the diethyl ether in the separator vapor is absorbed in the bottom liquid along with some other oxygenates. Since ethanol feed is used for washing the separator vapor, there is carry over of some ethanol feed to the DEE absorber vapors. The DEE absorber overhead vapors are routed below the bottom tray of the water wash tower. The water wash tower is designed to wash off oxygenates such as acetaldehyde, unconverted alcohols from the reactor section, ethanol carryover from the DEE absorber vapors, acetic acid etc. using treated water from the waste water stripper bottoms. The treated water enters the top tray of the water wash tower and the absorption of oxygenates occurs in a counter current direction over multiple trays. The water wash tower overhead vapors after the wash are routed to the downstream ethylene compression section, while the liquid bottoms stream with all the dissolved oxygenates/alcohols are routed to the waste water stripper.

The expected process conditions and conversion and selectivity on a dry ethanol feed basis are shown in the following Table.

TABLE

| Parameter | Value |
| --- | --- |
| Feed Rate, MMGPY | 300.0 |
| Steam to Ethanol (dry basis) Mass ratio | 1.5 |
| Reactor Inlet Temperature, Degree C. | 450 |
| Lag Reactor Outlet Pressure, kPa(g) | 450 |
| LHSV (on dry ethanol in fresh feed basis) $hr^{-1}$ | 1.0 |
| Overall Ethanol Conversion % | 99.9 |
| Ethylene Selectivity, Wt % | 97+ |
| Olefins Selectivity, wt % | 99+ |
| Oxygenates and other side products | Ppm levels |

DESCRIPTION OF THE DRAWING

In FIG. 1, in accordance with an exemplary embodiment, a process 10 is shown for processing an oxygenate feedstock. The oxygenate feedstock may comprise alcohol and preferably comprises ethanol. The feedstock may comprise a predominance of ethanol and may be aqueous. Preferably, the oxygenate feedstock is a biorenewable feedstock.

A feed line 12 transports an oxygenate stream of oxygenate feedstock to a feed pretreatment section 14. The feed pretreatment section 14 comprises a vessel 16 comprising a bed of cationic exchange resin adsorbent for removing metal contaminants, such as sodium, zinc, phosphates, copper, and calcium from the oxygenate stream in the feed line 12. The feed pretreatment section 14 may comprise an additional vessel 18 with a bed of the same adsorbent for further removing metals from the oxygenate stream. The vessels 16, 18 may be in series or in a lead-lag type of arrangement to allow for regeneration of spent adsorbent. Line 17 transports partially pretreated oxygenate stream from an outlet of vessel 16 to the inlet of vessel 18. A pretreated oxygenate stream exits the feed pretreatment section 14 in line 20 from an outlet of the additional vessel 18 and is fed to a purification column 22. The feed pretreatment section 14 may be operated at a temperature of about 32° C. to about 105° C. and a pressure of about 2800 kPa(g) to about 3100 kPa(g).

In the purification column 22, the pretreated oxygenate stream is fractionated to separate ethanol from heavier oxygenates also known as fusel oil such as cyclohexanol, cyclopentanol, and heavier acids. The purification column 22 is operated to minimize ethanol to no more than 1% of feed in bottom stream in line 26. A heavy oxygenate stream in a bottoms line 26 is taken from a bottom of the purification column 22 to heavy oxygenate treatment. The purification column 22 may be reboiled by heat exchange with a suitable hot stream such as steam to provide the necessary heat for the distillation. The purification column 22 provides an overhead gaseous stream of purified ethanol in an overhead line 24 which may be cooled in an air cooler 25 and fed to a feed surge drum 26 along with a recycle ethanol stream in line 27. The purification column 22 may be operated with a bottoms temperature between about 82° C. and about 121° C. and an overhead pressure of about 35 kPa(g) to about 140 kPa(g).

Ethanol in the feed surge drum 26 may be blanketed with nitrogen. A charge pump 29 pumps an ethanol charge stream in line 28 into two charge streams. A first charge stream in line 30 is heat exchanged with a first dehydrated exchange stream in line 32, mixed with steam in line 33 and fed to a first charge heater 34. The first charge heater 34 may be a fired heater and may heat the first charge stream to about 400° C. to about 550° C. A resulting first heated charge stream in line 36 is charged to a first dehydration reactor 40. In the first dehydration reactor 40, ethanol feed is converted to ethylene and water over a dehydration catalyst at a pressure of about 455 kPa(g) to about 630 kPa(g). A first dehydrated stream is discharged from the first dehydration reactor 40 in line 42.

A second charge stream in line 44 is heat exchanged with a second dehydrated exchange stream in line 46, mixed with the first dehydrated stream in line 42 and fed to a second charge heater 48. The second charge heater 48 may be a fired heater and may heat the second charge stream to about 400° C. to about 550° C. A resulting second heated charge stream in line 50 is charged to a second dehydration reactor 52. In the second dehydration reactor 52, ethanol feed is converted to ethylene and water over a dehydration catalyst at a pressure of about 420 kPa(g) to about 700 kPa(g) A second dehydrated stream is discharged from the second dehydration reactor 52 in line 54.

The second dehydrated stream in line 54 is fed to an interheater 56. The interheater 56 may be a fired heater and may heat the second dehydrated stream to about 400° C. to about 550° C. A resulting third heated charge stream in line 58 is charged to a third dehydration reactor 60. In the third dehydration reactor 60, residual ethanol feed is converted to ethylene and water over a dehydration catalyst at a pressure of about 420 kPa(g) to about 700 kPa(g), A third dehydrated stream is discharged from the third dehydration reactor 60 in line 62.

The dehydration catalyst is alumina-based catalyst.

The third dehydrated stream is split between the first dehydrated exchange stream in line 32 and the second dehydrated exchange stream in line 46. The first dehydrated exchange stream in line 32 is heat exchanged with the first charge stream in line 30, and the second dehydrated exchange stream in line 46 is heat exchanged with the second charge stream in line 44 and the cooled dehydrated streams are recombined in line 64.

The cooled dehydrated stream in line 64 are fed to a quench tower 68 in which the cooled dehydrated stream is quenched by direct contact with water from a first cooled water stream in line 70 and a second cooled water stream in line 72. A quenched ethylene stream exits in a quench overhead line 74 and a bottoms water stream exits the tower bottoms in line 76. The bottoms water stream is split between a drain stream in line 78 which may be transported to a waste water stripper column 80 through a control valve thereon and a quench recycle stream in line 82. A first portion of the quench recycle stream is air cooled in a product condenser 69 and recycled as the first, lower cooled water stream in line 70 through a control valve thereon, and a second portion of the quench recycle stream is heat exchanged in a trim condenser 71 and recycled to the quench tower 68 as the second, higher cooled water stream in line 72. The quench tower 68 may be operated with a bottoms temperature of about 37° C. to about 104° C. and a pressure of about 280 kPa(g) to about 490 kPa(g) in the overhead.

The quenched ethylene stream in line 74 is fed to a first stage suction drum 86. In the first stage suction drum ethylene exits the overhead line 88 to a first stage compressor 90 while residual water exits the bottom of the drum in line 92 through a control valve thereon and is transported to the waste water stripper column 80 perhaps via line 78. The first stage compressor 90 compresses the ethylene stream to a first pressure of about 350 kPa(g) to about 1225 kPa(g) and the discharge in line 91 is cooled in a first stage discharge cooler 93 and a first stage trim cooler 94.

The cooled, compressed ethylene stream from the first stage trim cooler 94 is fed to a first stage discharge drum 96. From the first stage discharge drum 96 ethylene exits in an overhead line 98 to a second stage compressor 100 while residual water exits a bottom of the drum in line 102 through a control valve thereon and is transported to the waste water stripper column 80 perhaps via lines 92 and 78. The second stage compressor compresses the ethylene stream to a second pressure of about 455 kPa(g) to about 3220 kPa(g) and the discharge in line 101 is cooled in a second stage discharge cooler 103 and a second stage trim cooler 104.

The twice cooled, compressed ethylene stream from the second stage trim cooler 104 is fed to a second stage discharge drum 106. From the second stage discharge drum 106 ethylene exits in an overhead line 108 and is transported to a water wash tower 110 while a residual water stream exits the bottom of the drum in line 112 through a control valve thereon and is transported to the waste water stripper column 80 perhaps via lines 102, 92 and 78.

In the water wash tower 110, the twice cooled, compressed ethylene stream is counter-currently washed with cooled, treated water in line 118 from the waste water stripper column 80 to absorb additional oxygenates to produce a washed ethylene stream exiting in an overhead line 120 and a wash water stream in a bottoms line 122. The washed ethylene stream in the overhead line 120 is transported to a product dryer section 140. The wash water stream in line 122 is transported back to the water stripper column 80 through a control valve thereon. The wash water 110 may be operated with a bottoms temperature of about 16° C. to about 82° C. and a pressure of about 2800 kPa(g) to about 3500 kPa(g) in the overhead.

In other flow schemes than the current flow scheme, the washed ethylene stream could be sent to a caustic scrubber section to remove oxygenates. However, it has been found that the process may be operated successfully under certain operating conditions without the use of a caustic scrubber and produce ethylene for further processing as an olefinic feed stock, for example, for ethylene oligomerization. section. Instead, as described below, the waste water stripper bottoms stream is routed to the top tray of the water wash tower while the vapor from the second stage compressor discharge is routed below the bottom tray of the water wash tower. The intent is to wash the ethylene rich vapor stream and remove the oxygenates as much as possible from the product stream. The ethylene rich vapor with ppm traces of CO and ppm levels of CO2 is routed directly to a set of driers containing molecular sieves in a lead-lag system to remove the moisture in the vapor stream and is further routed to the cryogenic distillation unit. The vapor from the cryogenic distillation unit is further compressed in a third stage of ethylene compressor to meet the downstream unit battery limit pressure requirement.

In the product drier section 140, the washed, scrubbed ethylene stream in line 120 is fed to a first drier inlet knock-out drum 146 to remove residual water and provide a drier inlet stream in line 148 and a knock-out water stream in the bottoms line 150 which is fed to the waste water stripper column 80 via line 122. The drier inlet stream is fed to a first product drier 152 in line 148. The first product drier 152 comprises an adsorbent for adsorbing the water from ethylene in the drier inlet stream in line 148 to provide a dried ethylene stream. The adsorbent may be a molecular sieve material with pore diameters of 2-4 A. The first product drier 152 may operate in upflow mode. The product drier section 140 may include a second product drier 156 that operates as the first product drier 142. The two product driers may be operated in series but are preferably arranged in a lead-lag operation to facilitate regeneration during continuous operation. The second product drier 156 comprises an adsorbent for adsorbing the water from ethylene like in the first product drier 152. A dried ethylene stream exits the product drier section 140 in a dried ethylene stream in line 158. The product drier section 140 may be operated at a temperature of about 32° C. to about 105° C. and a pressure of about-2800 kPa(g) to about 3100 kPa(g)

The dried ethylene stream in line 158 is fed to a drier outlet knock-out drum 160 to remove residual water and provide a drier outlet stream in line 162 and a second knock-out water stream in a bottoms line 164 which is fed to the waste water stripper column 80 perhaps via lines 150 and 122.

The drier outlet stream in line 162 may be fed to a heavy oxygenates removal column 170 to separate an overhead stream comprising predominantly ethylene but perhaps higher olefins from heavy ketones and diethyl ether. The olefins are produced in an overhead line 172 and fed to a third stage compressor 174 and a bottoms heavy oxygenate stream is produced in a bottoms line 176. A heavy oxygenate purge stream may be taken in line 178 to heavy oxygenate treatment while a reboil portion is reboiled and fed back to the column 170. A compressed ethylene stream at a pressure of about 2800 kPa(g) to about 7000 kPa(g) in a compressor discharge line 176 may be provided to a dimerization section. The heavy oxygenate removal column 170 may be operated with a bottoms temperature of about −30° C. to about 120° C. and a pressure of about 2415 kPa(g) to about 3100 kPa(g) in the overhead.

Water streams comprising oxygenates and volatiles in lines 92, 102, 112, 122, 150, 164 may be fed to the waste water stripper column 80 in which volatiles and oxygenates are boiled off to provide an overhead volatile stream in line 182 and a stripped water stream in line 184. A portion of the stripped water stream can be reboiled and fed back to the column to provide necessary heat. A treated water stream in line 186 may be pumped to water outlets in line 188 which includes the cooled, treated water stream in line 118 for the water wash tower 110. The waste water stripper column 80 may be operated with a bottoms temperature of about 90° C. to about 120° C. and a pressure of about 35 kPa(g) to about 140 kPa(g) in the overhead.

The overhead volatile stream in line 182 may be cooled in an air cooler 189 and fed to an off-gas knock out drum 190. An overhead stream from the knock out drum 190 in line 192 may be sent to flare while an ethanol recycle stream is pumped to the feed surge drum 26 in line 27 perhaps via line 24.

While the following is described in conjunction with specific embodiments, it will be understood that this description is intended to illustrate and not limit the scope of the preceding description and the appended claims.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius, all pressures are in kPa(g) and, all parts and percentages are by weight, unless otherwise indicated, and wherein n is an integer from 20 to 2000.

A first embodiment is a process of treating a stream comprising ethylene and oxygenates comprising sending said stream to a water wash tower and sending a resulting ethylene rich vapor stream directly to a dryer without first being sent to a caustic wash section. A second embodiment is a process of converting an ethanol feed stream to ethylene comprising dividing said ethanol feed stream into a first portion and a second portion; sending said first portion to a reactor through a charge heater; mixing steam with said first portion at said charge heater and sending an ethanol/steam mixture to said reactor; subjecting said ethanol/steam mixture to sufficient conditions to dehydrate said ethanol to produce an effluent comprising ethylene and water; combining said effluent with said second portion to form an effluent/second portion mixture and sending said mixture to a second reactor to be reacted to produce a product effluent comprising ethylene and water. An embodiment of the invention is one, any or all of prior embodiments in this paragraph up through the first embodiment in this paragraph wherein said first portion or said second portion comprise a mixture of ethanol and water. An embodiment of the invention is one, any or all of prior embodiments in this paragraph up through the first embodiment in this paragraph wherein said water is recycled and mixed with said ethanol feed stream.

A third embodiment of the invention is a process of converting an ethanol feed stream to ethylene comprising dividing said ethanol feed stream into a first portion and a second portion to be sent to a reactor section comprising a first reactor and a second reactor; sending said first portion to said first reactor through a charge heater; mixing steam with said first portion at said charge heater and sending an ethanol/steam mixture to said first reactor; subjecting said ethanol/steam mixture to sufficient conditions to dehydrate said ethanol to produce an effluent comprising ethylene and water; combining said effluent with said second portion to form an effluent/second portion mixture and sending said effluent/second portion mixture to said second reactor to be reacted to produce a product effluent comprising ethylene and water. An embodiment of the invention is one, any or all of prior embodiments in this paragraph up through the first embodiment in this paragraph wherein said first portion or said second portion comprise a mixture of ethanol and water. An embodiment of the invention is one, any or all of prior embodiments in this paragraph up through the first embodiment in this paragraph wherein said water is recycled and mixed with said ethanol feed stream. An embodiment of the invention is one, any or all of prior embodiments in this paragraph up through the first embodiment in this paragraph wherein said reactor section is about 30-40% less in volume than in a dehydration process wherein said ethanol feed stream remains a single stream. An embodiment of the invention is one, any or all of prior embodiments in this paragraph up through the first embodiment in this paragraph wherein said reactor section further comprises a third reactor vessel. An embodiment of the invention is one, any or all of prior embodiments in this paragraph up through the first embodiment in this paragraph wherein an oxygenate feedstock is pretreated to remove contaminants and then a pretreated oxygenate stream is sent to said reactor section. An embodiment of the invention is one, any or all of prior embodiments in this paragraph up through the first embodiment in this paragraph wherein said pretreated oxygenate stream is fractionated to separate ethanol from heavier oxygenates and then said ethanol is said ethanol feedstream. An embodiment of the invention is one, any or all of prior embodiments in this paragraph up through the first embodiment in this paragraph wherein said ethanol feedstream sent to said first reactor is heated to about 400° C. to about 550° C. and converted to ethylene over a dehydration catalyst at about 455 kPa to about 630 kPa(g). An embodiment of the invention is one, any or all of prior embodiments in this paragraph up through the first embodiment in this paragraph wherein said effluent/second portion mixture is heated to about 400° C. to about 550° C. and converted to ethylene over a dehydration catalyst at about 420 kPa(g) to about 700 kPa(g). An embodiment of the invention is one, any or all of prior embodiments in this paragraph up through the first embodiment in this paragraph wherein said product effluent from said second reactor is sent to an interheater and then a heated product effluent is sent to a third reactor. An embodiment of the invention is one, any or all of prior embodiments in this paragraph up through the first embodiment in this paragraph wherein a product effluent of said third reactor contains no measurable diethyl ether. An embodiment of the invention is one, any or all of prior embodiments in this paragraph up through the first embodiment in this paragraph wherein said first and second reactor contain less steam than when all of said ethanol feed stream is sent to a single reactor with said first and second reactors operating at an increased endotherm level. An embodiment of the invention is one, any or all of prior embodiments in this paragraph up through the first embodiment in this paragraph wherein said product effluent is not sent to a caustic wash section.

The invention claimed is:

1. A process of converting an ethanol feed stream to ethylene comprising:
    a. dividing said ethanol feed stream into a first portion and a second portion;
    b. sending said first portion to a reactor through a charge heater;
    c. mixing steam with said first portion and feeding a first portion and steam mixture to a charge heater to produce a first heated charge stream;
    d. sending said first heated charge stream to said reactor;
    e. subjecting said first heated charge stream to sufficient conditions to dehydrate said ethanol to produce an effluent comprising ethylene and water;
    f. combining said effluent with said second portion to form an effluent and second portion mixture and sending said mixture to a second reactor to be reacted to produce a product effluent comprising ethylene and water.

2. The process of claim 1 wherein said first portion or said second portion comprise a mixture of ethanol and water.

3. The process of claim 2 wherein said water is recycled and mixed with said ethanol feed stream.

4. A process of converting an ethanol feed stream to ethylene comprising:
    a. dividing said ethanol feed stream into a first portion and a second portion to be sent to a reactor section comprising a first reactor and a second reactor;
    b. sending said first portion to said first reactor through a charge heater;
    c. mixing steam with said first portion and feeding a first portion and steam mixture to a charge heater to produce a first heated charge stream;
    d. sending said to first heated charge stream to said reactor;
    e. subjecting said first heated charge stream to sufficient conditions to dehydrate said ethanol to produce an effluent comprising ethylene and water;
    f. combining said effluent with said second portion to form an effluent and second portion mixture and sending said effluent and second portion mixture to said second reactor to be reacted to produce a product effluent comprising ethylene and water.

5. The process of claim 4 wherein said first portion or said second portion comprise a mixture of ethanol and water.

6. The process of claim 4 wherein said water is recycled and mixed with said ethanol feed stream.

7. The process of claim 4 wherein said reactor section further comprises a third reactor vessel wherein a reactor effluent from said third reactor comprises no measurable diethyl ether.

8. The process of claim 4 wherein an oxygenate feedstock is pretreated to remove contaminants and then a pretreated oxygenate stream is sent to said reactor section.

9. The process of claim 8 wherein said pretreated oxygenate stream is fractionated to separate ethanol from heavier oxygenates and then said ethanol is said ethanol feedstream.

10. The process of claim 4 wherein said ethanol feedstream sent to said first reactor is heated to about 400° C. to about 550° C. and converted to ethylene over a dehydration catalyst at about 455 kPa (g) to about 630 kPa (g).

11. The process of claim 4 wherein said effluent and second portion mixture is heated to about 400° C. to about 550° C. and converted to ethylene over a dehydration catalyst at about 420 kPa (g) to about 700 kPa (g).

12. The process of claim 4 wherein said product effluent from said second reactor is sent to an interheater and then a heated product effluent is sent to a third reactor.

13. The process of claim 4 wherein said product effluent is not sent to a caustic wash section.

* * * * *